Figure 4:
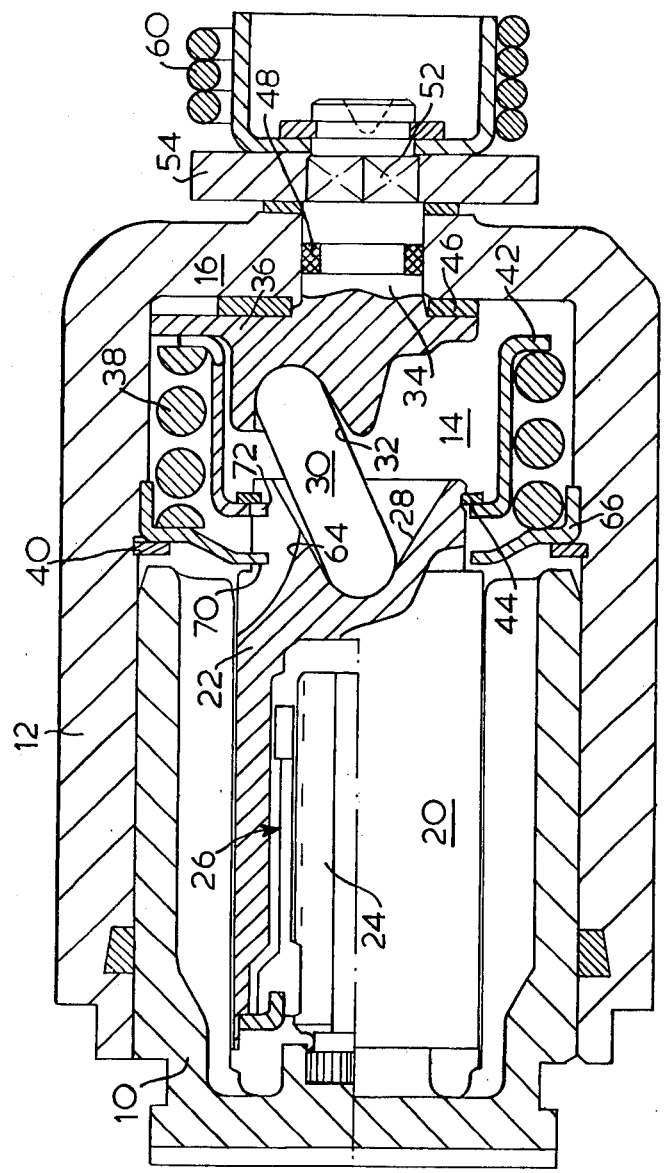

United States Patent [19]

Heibel

[11] 4,063,621
[45] Dec. 20, 1977

[54] HYDRAULIC BRAKE ACTUATOR

[75] Inventor: Helmut Heibel, Moschheim, Germany

[73] Assignee: Girling Limited, Birmingham, England

[21] Appl. No.: 690,871

[22] Filed: May 28, 1976

Related U.S. Application Data

[63] Continuation of Ser. No. 513,088, Oct. 8, 1974, abandoned.

[30] Foreign Application Priority Data

Oct. 9, 1973 United Kingdom ............... 47004/73

[51] Int. Cl.² .............................................. F16D 55/02
[52] U.S. Cl. ...................................... 188/72.6; 74/107
[58] Field of Search .................. 92/3, 114, 13.4, 13.6; 188/106 F, 72.6, 72.7, 72.9; 74/105, 107, 60

[56] References Cited

U.S. PATENT DOCUMENTS

| 3,424,279 | 1/1969 | Frigger | 188/72.6 |
|---|---|---|---|
| 3,443,670 | 5/1969 | Margetts | 188/106 |
| 3,482,665 | 12/1969 | Meier | 188/196 |
| 3,507,367 | 4/1970 | Brown | 188/106 |
| 3,647,031 | 3/1972 | Burnett | 188/72.6 |
| 3,665,873 | 5/1972 | Wittler | 74/60 |
| 3,783,981 | 1/1974 | Burgdorf | 188/106 |

FOREIGN PATENT DOCUMENTS

650,873  10/1962  Canada ................................ 74/107

Primary Examiner—Martin P. Schwadron
Assistant Examiner—Abraham Hershkovitz
Attorney, Agent, or Firm—Scrivener, Parker, Scrivener & Clarke

[57] ABSTRACT

A hydraulic brake actuator having a piston slidable in a cylinder for hydraulic service brake operation also incorporates a mechanical linkage for handbrake operation. The mechanical linkage comprises a cranked shaft journalled in a closed end wall of the cylinder, a linearly displaceable peg and a strut interconnecting the cranked shaft and peg such that rotation of the cranked shaft causes linear displacement of the peg. The cranked part of the shaft of the strut and the peg are preferably contained wholly within a hydraulic working chamber defined by the piston and cylinder so that when the service brake and handbrake are applied simultaneously, movement of the mechanical components does not cause a change in the volume of the chamber and prevailing hydraulic fluid pressure will not therefore affect such movement.

11 Claims, 4 Drawing Figures

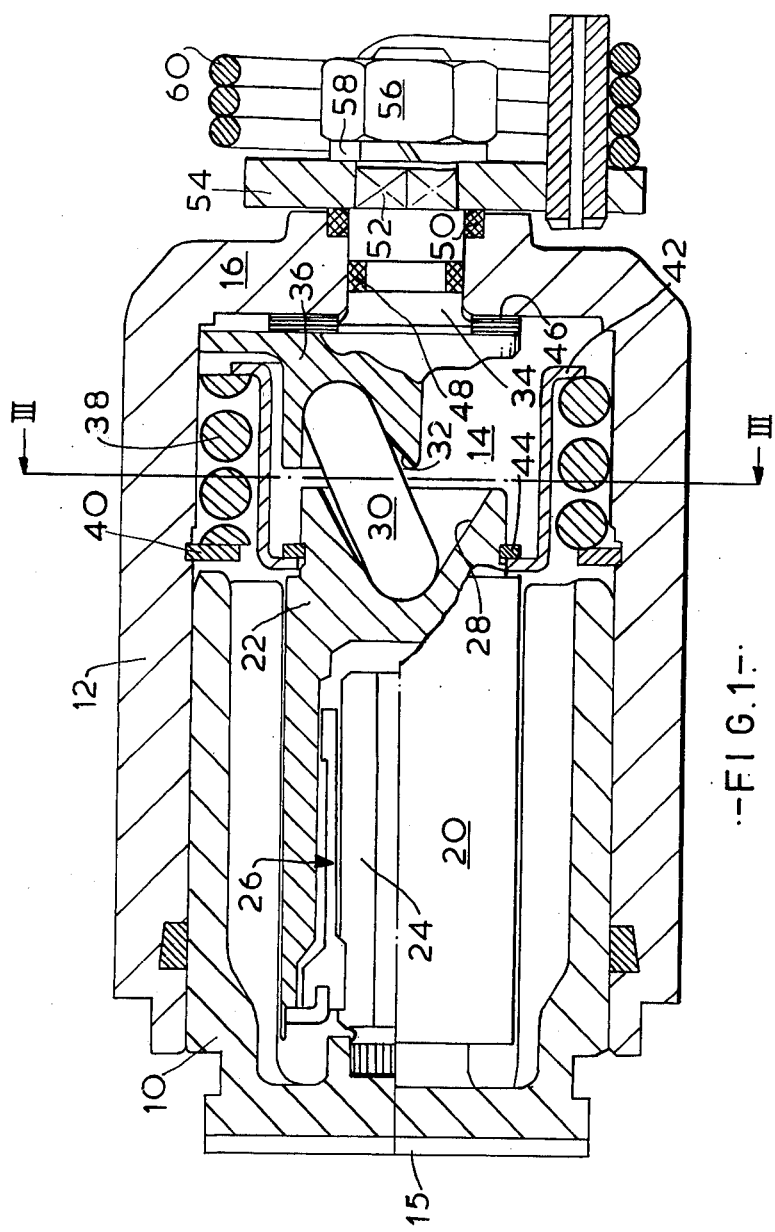

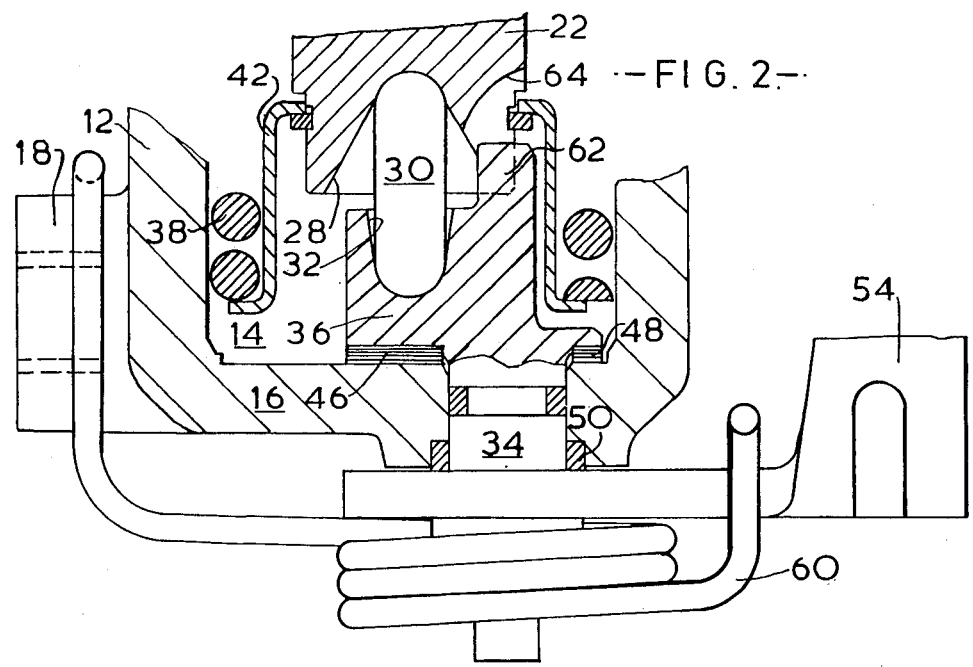
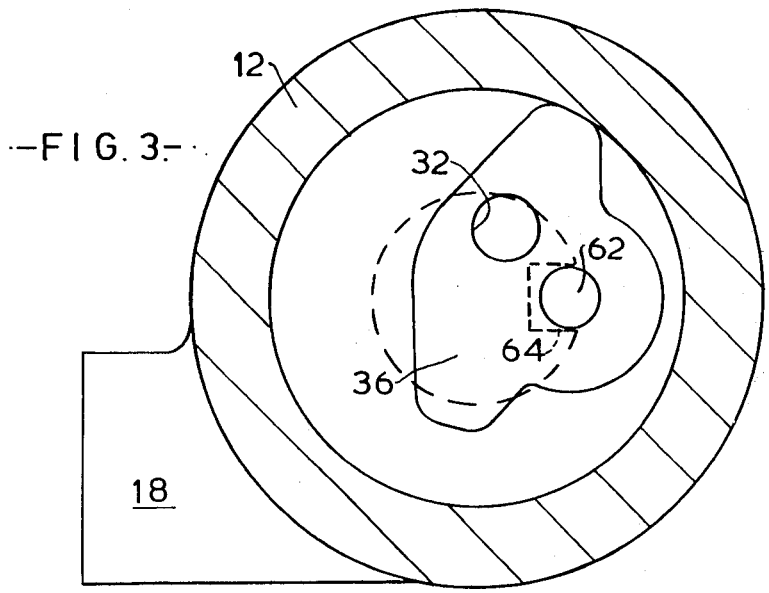

HYDRAULIC BRAKE ACTUATOR

This is a continuation of application Ser. No. 513,088 filed Oct. 8, 1974.

The present invention relates to hydraulic brake actuators.

According to the present invention, there is provided a hydraulic brake actuator comprising a cylinder, a piston slidable in the cylinder to define a hydraulic working chamber between the piston and a closed end of the cylinder, a linearly displaceable peg for mechanical brake actuation, a cranked shaft journalled in said end wall, and a strut interconnecting the cranked shaft and the peg, the cranked shaft being rotatable from a first position in which the strut is inclined to the direction of peg displacement to a second position in which the inclination of the strut is reduced whereby to displace the peg away from said end wall.

In a preferred embodiment, a cranked shaft is rotatable about an axis which is aligned with the direction of displacement of the peg and the strut is positioned between respective seating on the cranked shaft and the peg. The strut seating of the cranked shaft is off-set with respect to the axis of rotation of the cranked shaft, said axis in turn being off-set with respect to the strut seating of the peg. Preferably the strut seating is positioned substantially centrally of the end of the peg and the cranked shaft is journalled eccentrically in the end wall of the cylinder. In the preferred embodiment the cranked portion of the shaft, the strut and the peg are positioned within the hydraulic working chamber so that rotation of the shaft and sequential displacement of the strut and peg do not tend to force hydraulic working fluid from the working chamber as is the case in prior art arrangements in which the peg or an equivalent member passes through a seal out of the working chamber for connection to an external cam, lever or other actuating member. Such prior art arrangement are not necessarily disadvantageous when mechanical actuation alone is required as outward movement of the piston or outward movement of the peg through the piston will compensate for fluid displacement caused by movement of the peg through the seal into the working chamber. However, when both hydraulic and mechanical actuation is required hydraulic fluid under pressure will fully displace the piston and movement of the peg into the working chamber upon mechanical actuation will be resisted by the fluid under pressure of the working chamber. Thus the effect of mechanical actuation under such conditions is reduced. The preferred embodiment of the present invention, by avoiding fluid displacement upon mechanical actuation, renders mechanical actuation independent of hydraulic actuation.

The invention is further described, by way of example with reference to the accompanying drawings in which:

FIG. 1 is an axial section through a hydraulic brake actuator constructed in accordance with the invention, FIG. 2 is an axial section through a part of the actuator shown in FIG. 1 taken at right angles to the plane of section in FIG. 1, FIG. 3 is a section on the line III—III of FIG. 1 showing in phantom the outline of the peg shown in FIGS. 1 and 2, and FIG. 4 is a section similar to FIG. 1 through a modified actuator.

The actuator shown in the drawings comprises a hollow piston 10 slidable in a cylinder 12 to define a working chamber 14 between the piston 10 and an end wall 16 of the cylinder 12. Fluid flow into and out of the chamber 14 is by way of a port 18 adapted for connection to a fluid line. The piston 10 extends from the open end of the cylinder for abutment with a brake element such as a friction pad back plate 15.

Within the hollow piston 10 is arranged a peg 20 comprising an outer sleeve 22, an inner spigot 24 connected to the piston and a ratchet mechanism 26 between the sleeve 22 and spigot 24. Interconnection of the sleeve 22 and spigot 24 may be by means of a ratchet mechanism 26 of the type shown, for example, in the patent to Hoenick U.S. Pat. No. 3,402,791, which is generally conventional and need not be described in detail and, allows for automatic adjustment of the overall length of the peg 20. The end of the sleeve 22 adjacent to the cylinder end wall 16 is formed centrally with a recess 28 which serves as a seating for a round-ended strut 30, the other end of which seats in a recess 32 in a cranked shaft 34 journalled in the end wall 16 of the cylinder. The recess 32 is formed in a flange 36 at the inner end of the shaft 34 and is off-set with respect to the axis about which the shaft 34 rotates in the end wall 16.

A compression spring 38 located between a spring ring 40 engaged in a recess in the cylinder wall and a cup 42 engaging a spring ring 44 in a recess in the sleeve 22 urges the sleeve in a return direction and presses the flange 36 of the shaft against a shim 46 of anti-friction material positioned between the flange 36 and the cylinder end wall 16. It will be apparent that the flange 36, shim 46 and the inner face of the end wall 16, which is perpendicular to the axis of shaft rotation, define thrust bearing means which supports the cranked shaft 34 within the working chamber with the bearing means itself also being disposed entirely within the working chamber so as to be in contact with the hydraulic fluid. The described bearing means accepts forces from hydraulic actuation, with the journal in the end wall itself being always lightly loaded due to the fact that only light residual axial thrust is exerted thereon during hydraulic actuation, the main part of this thrust load being absorbed by the afore-described thrust bearing composed of the flange, shim and end wall. A fluid seal 48 and a dirt-excluder seal 50 are positioned around the shaft 34 which, outside the cylinder 12, has a polygonal formation 52 on which is mounted an actuating lever 54. The lever 54 is held in place by a nut 56 and spring washer 58 and is biased into a first position by a torsion spring 60. The said first position of the lever 54 corresponds to the cranked shaft position shown in FIG. 3 in which the recesses 28 and 32 are off-set laterally by a maximum spacing. Movement of the lever 54 against the torsion spring 60 reduces the lateral off-set between the recesses 28 and 32 thereby reducing the inclination of the strut 30 and forcing the peg 20 away from the cylinder end wall 16 to mechanically displace the piston 10. To prevent rotation of the sleeve 22 which would interfere with the correct functioning of the automatic adjuster, the flange 36 is formed with a projection 62 which is coaxial with the shaft 34 and which engages in a recess 64 in the sleeve 22.

In the alternative arrangement shown in FIG. 4, the projection 62 is omitted and a second cup 66 is interposed between the return spring 38 and the spring ring 40, the cup-shaped member having an inwardly extending portion 70 which projects into the recess 64 in the sleeve 22. The cup 42 may have a similar inwardly extending portion 72.

Whilst the peg 20 is shown to be attached to the piston 10, the peg may extend through the piston to abut directly against the friction pad back plate or other braking element to be displaced by the actuator.

I claim:

1. A mechanical actuator for a vehicle brake, comprising a linearly displaceable peg for displacing a friction element, a mechanical actuating member for effecting peg displacement, means mounting said mechanical actuating member for rotation between first and second peg displacement positions about an axis aligned with the direction of peg displacement, a seating in said actuating member and a seating in an adjacent end of said peg, said seatings being off-set with respect to each other, when said actuating member is in its first position, means for preventing movement of said actuating member seating in the direction of peg displacement during movement of said actuating member between its first and second peg displacing positions, and an inclined strut engaging in said seatings and interconnecting said peg and said actuating member, said seating in said actuating member being also off-set with respect to said axis and said axis being off-set with respect to the seating in said peg, whereby rotation of said actuating member about said axis from its first towards its second peg displacing position reduces the inclination of said strut with respect to the direction of said peg displacement and thereby displaces said peg away from said actuating member.

2. A mechanical actuator for a vehicle brake in accordance with claim 1 including a working chamber having an end wall, said peg, inclined strut and mechanical actuating member being disposed within the working chamber, said end wall defining the means mounting the actuating member for rotation about said axis.

3. The actuator of claim 2 wherein the actuating member is a cranked shaft extending through the end wall and having its cranked portion within said working chamber and carrying the seating of said actuating member.

4. An actuator as claimed in claim 3 in which said axis or rotation is off-set with respect to the axis of said peg and the cranked portion of said shaft has a projection aligned with said axis of rotation and which cooperates with a recess in the peg to prevent rotation of the peg.

5. The actuator of claim 3 wherein said shaft carries within said working chamber a flange adapted to transmit to a cooperating plane surface of said end wall forces acting on said flange in a direction opposite to the direction of operative movement of said peg, said plane surface being substantially perpendicular to the axis of shaft rotation.

6. An actuator as claimed in claim 5 having anti-friction means interposed between said flange and said end wall.

7. The actuator of claim 6 wherein said anti-friction means comprises thrust bearing means disposed wholly within said working chamber to support said actuating member and arranged to sustain entirely within said chamber all of the thrust exerted by said actuating member on said peg.

8. An actuator as claimed in claim 2 in which the strut seating of the peg is positioned substantially centrally of the end of the peg and the actuating member is journalled eccentrically in said end wall.

9. An actuator as claimed in claim 2 in which the working chamber has a projection which cooperates with the peg to prevent rotation of the peg.

10. The actuator of claim 2 including a cylinder, a piston in the cylinder, said working chamber being a closed hydraulic working chamber in said cylinder between the piston and said end wall, said piston and cylinder being slidable relative to each other in response to hydraulic pressure in said working chamber to displace said friction element hydraulically.

11. A mechanical actuator for a vehicle brake, comprising a linearly displaceable peg for displacing a friction element, a mechanical actuating member for effecting peg displacement, means mounting said mechanical actuating member for rotation between first and second peg displacing positions about an axis aligned with the direction of peg displacement, a seating in said actuating member and a seating in an adjacent end of said peg, said seatings being off-set with respect to each other, when said actuating member is in its first position, means for preventing movement of said actuating member seating in the direction of said axis during movement of said actuating member between its first and second peg displacing positions and an inclined strut engaging in said seatings and interconnecting said peg and said actuating member, said seating in said actuating member being also off-set with respect to said axis and said axis being off-set with respect to the seating in said peg, whereby rotation of said actuating member about said axis from its first towards its second peg displacing position reduces the inclination of said strut with respect to the direction of said peg displacement and thereby displaces said peg away from said actuating member.

* * * * *